United States Patent [19]

Henderson et al.

[11] Patent Number: 5,551,881

[45] Date of Patent: Sep. 3, 1996

[54] METHOD AND SYSTEM FOR GEOPHYSICAL AND GEOLOGIC MODELING

[75] Inventors: Gerald J. Henderson; Peter C. Johnson; Lawrence B. Sullivan, all of Plano, Tex.

[73] Assignee: Atlantic Richfield Company, Los Angeles, Calif.

[21] Appl. No.: 470,429

[22] Filed: Jun. 6, 1995

Related U.S. Application Data

[60] Division of Ser. No. 896,047, Jun. 9, 1992, Pat. No. 5,451,164, and a continuation-in-part of Ser. No. 714,272, Jun. 12, 1991, abandoned.

[51] Int. Cl.$^6$ ........................................ G06F 15/00
[52] U.S. Cl. ..................... 434/299; 434/276; 181/101; 181/108
[58] Field of Search ........................ 434/299; 364/468, 364/472, 474.01, 474.02, 474.05; 181/101–108, 111–113

[56] References Cited

U.S. PATENT DOCUMENTS

| | | | |
|---|---|---|---|
| 3,949,352 | 4/1976 | Vogel | 367/31 |
| 4,575,330 | 3/1986 | Hull . | |
| 4,707,787 | 11/1987 | Savit et al. . | |
| 4,850,449 | 7/1989 | Cheung . | |
| 4,961,154 | 10/1990 | Pomerantz et al. . | |
| 5,031,120 | 7/1991 | Pomerantz et al. | 364/468 |

OTHER PUBLICATIONS

Naylor, et al., "Fault geometries in basement-induced wrench faulting under different initial stress states", J. Structural Geology, vol. 8 No. 7.

Hildebrand–Mittlefehldt, "Strain fields in and around boudins in a clay experiment, J. Structural Geology", vol. 5, No. 3/4 (Pergamon, 1983), pp. 465–470.

"The Acuson 128 Computed Sonography System," (Acuson Corporation).

Primary Examiner—Richard J. Apley
Assistant Examiner—Glenn E. Richman
Attorney, Agent, or Firm—Anderson, Levine & Lintel

[57] ABSTRACT

A method and system for using sonography to image the internal structure of geophysical and geologic models are disclosed. The sonography system includes a wand having a plurality of piezoelectric elements at an active surface thereof, each coupled to driver/receiver circuitry. Certain of the piezoelectric elements are selected as ultrasonic sources and receivers; the source/receiver designation may vary over time, as each of the elements may either generate or receive acoustic energy. A computer system, connected to the wand, receives signals from the receivers corresponding to reflected and refracted ultrasonic energy, and generates a zero offset trace image therefrom. In the geophysical case, the scale model is formed of materials such as plastics and rubbers having the desired properties for simulating the response of a portion or layer in the earth to ultrasonic vibrations. Sonography serves to measure the actual structure of the geophysical model, so that the effectiveness of seismic survey designs and data processing techniques may be evaluated. In the geologic case, the model is formed of clays, and a force applied thereto from one side. Sonography allows for real-time visibility into the internal structure of the model during the application of the force, so that the internal dynamics can be monitored. Dry sand geologic models can utilize sonographic inspection via a metal plate on the bottom of the model, which provides coupling of the ultrasonic energy into the dry sand bed.

13 Claims, 4 Drawing Sheets

METHOD AND SYSTEM FOR GEOPHYSICAL AND GEOLOGIC MODELING

The present application is a divisional of application Ser. No. 07/896,047, filed Jun. 9, 1992, now U.S. Pat. No. 5,451,164, and a continuation-in-part of application Ser. No. 714,272, filed Jun. 12, 1991, now abandoned, incorporated herein by reference, and assigned to Atlantic Richfield Company.

This invention is in the field of seismic surveying, and is more particularly directed to methods of simulating and modeling geophysical structures and geologic events.

BACKGROUND OF THE INVENTION

Geophysical and geologic study of the sub-surface structure of the earth continues to be an important field of endeavor for several reasons. The continued search for producing reservoirs of hydrocarbons, such as oil and gas, as well as for mineral deposits and sources of geothermal energy, is a particularly important motivation for obtaining information about the earth's crust. This information is also important in monitoring the movement of plates of the earth crusts, and thus in predicting and measuring geologic events ranging from slips which create hydrocarbon reservoir traps to catastrophic earthquakes. As a result of the economic importance of this technology, significant effort continues to be expended in developing new and improved surveying and interpretation techniques.

Conventional seismic surveying is generally performed by imparting energy to the earth at one or more source locations, for example by way of a controlled explosion, mechanical impact, or the like. Return energy is then measured at surface receiver locations at varying distances and azimuths from the source location. The travel time of energy from source to receiver, via reflection from and refraction by sub-surface strata and interfaces therebetween, is indicative of the depth of the strata and interfaces. In addition, various attributes of the detected energy (e.g., the difference in velocity of pressure versus shear waves, phase differences between input and received energy) are indicative of the composition of the strata.

This time-domain seismic information is conventionally interpreted to generate a survey of the sub-surface geology for the region of interest, usually in the form of a contour map indicating the location, depth and acoustic velocity of various sub-surface strata. From such maps and other presentations of the data, skilled geologists and geophysicists can infer the location and depth of potential hydrocarbon reservoirs, and other structures such as faults, strike-slips and the like at which reservoir traps may be present.

While conventional analysis of such seismic survey data is successful to a large degree, certain inaccuracies are often present. The detected signal will contain a "signal" portion corresponding to the reflected or refracted source energy. A "noise" component will also generally be present in the detected signal that masks the signal and reduces the sensitivity of the survey to strata and interfaces; such noise can be generated by the signal itself, or may be generated by external effects and thus unrelated to the signal. In addition, poorly designed surveys can result in spatial aliasing and related undesirable effects which cloud the interpretation. Furthermore, inaccuracies in the estimated acoustic velocity of particular formations, or in other assumptions used in data interpretation, will result in error in the resulting survey or contour map. According to conventional techniques, it is not uncommon for errors in the position or depth (or both) of a particular geologic structure to have magnitudes in the hundreds of feet.

Particularly in the case of drilling hydrocarbon wells, the cost of physically verifying the seismic survey, or alternatively the cost of a "dry hole" if the survey is inaccurate, can be quite significant. Furthermore, the margin for error in the seismic survey is continuing to shrink, as the difficulty in locating a producing well has increased in recent years due to prior exploitation of the more easily located reservoirs, with the remaining deeper and more difficult reservoirs being those to which current survey techniques are directed. In addition, particularly as the depth requirement for seismic surveys increases, the signal-to-noise ratio of the seismic energy becomes poorer. As a result of all of these factors, the modern exploration geophysicist is required to perform a task of increasing difficulty (accurate seismic analysis of deep and small reservoirs) with poorer quality information.

Furthermore, the cost of obtaining field data for seismic surveys has remained high over recent years. The analysis of previously existing seismic data (i.e., source and receiver traces) using new interpretation techniques has therefore become more popular in the industry, eliminating the cost of obtaining new seismic field data. Considering that several competitors may be analyzing the same raw data, proprietary data analysis routines and techniques have become an important asset of the exploration company. Significant development activity of new and improved noise reduction and cross-correlation techniques has resulted, in attempts to improve the resolution and sensitivity of the surveys, so that deeper and smaller sub-surface strata and interfaces can be located. Since the actual structure of the earth beneath any given location is not fully known, evaluation of new data analysis and processing techniques is quite difficult, and is limited to the comparison of new results against prior surveys or, if a newly discovered formation is indicated, by core sampling, drilling or the like.

Heretofore, new seismic data analysis routines have been tested and verified by way of models of the structure of a portion of the earth. These geophysical models, both of the numerical and physical types, have generally been designed to match actual regions of the earth being explored. Construction of a model of the surveyed region according to a contour map, followed by the performing of a scaled "seismic" survey on the model, provides a comparison of the seismic data acquired from the model with that from which the contour map was constructed. Differences between the field seismic data and that from the model indicate inaccuracies in the seismic data interpretation process originally applied to the field data. Re-interpretation of the previously acquired seismic data, or even acquisition of new seismic data from the region of interest, can then be performed to provide a new or adjusted survey of sufficient accuracy that drilling could be performed with reasonable confidence.

For such geophysical modeling, scale models of the earth have been formed by way of plaster and wood molds designed to match shapes in the contour map. The material molded by such molds is generally one of several two-part rubber or plastic materials having the desired physical properties, such as acoustic velocity (compressional, horizontal and vertical shear), density, and other elastic material properties. Each molded layer becomes a portion of the mold for the next adjacent layer, with the result being a laminated block of dimensions on the order of one to three feet on a side to represent the surveyed region. Scaled acoustic or ultrasonic sources and detectors are then deployed at the surface of the model, generally near the center of the top surface so that boundary effects at the sides of the model are effectively infinitely distant, and a scaled seismic survey is performed to simulate an actual field survey.

However, these prior scale models have not provided sufficiently accurate information on a timely enough basis to allow for useful verification of the survey information. This is due to the time-consuming and expensive construction of the molds, such that the use of the model is seldom sufficiently timely to meet business needs. Furthermore, the precision of this fabrication technique is limited to on the order of tenths of inches; for a typical scale of 1 inch to 1000 feet, an error on the order of tenths of inches results in a deviation of on the order of hundreds of feet in the earth. Therefore, not only are such simulations late, the results are also insufficient to determine if a deviation in the data is due to inaccuracy in the scale model, or truly due to inaccurate interpretation of the field data.

By way of further background, copending U.S. application Ser. No. 714,272, filed Jun. 12, 1991, incorporated herein by reference, and assigned to Atlantic Richfield Company, describes a new method for fabricating a scale model using stereolithography. This method provides a smaller and more accurate geophysical model, with much reduced fabrication time, as compared with the conventional plaster molding technique described hereinabove. The precision of a model formed according to stereolithography, as described in this copending application, is much superior than such conventional methods.

Actual measurement of the finished scale model would allow one to account for dimensional inaccuracy of the model in analyzing the simulation data. However, actual measurement of the model must be performed in a non-contact manner so that the model can be useful after such measurement. Conventional non-contact measurement techniques, such as x-ray, CAT scan, or other imaging techniques, are not only expensive, but are quite cumbersome for objects of the size of these models, generally on the order of two to three feet on a side for the plaster molded models; such imaging techniques, while more convenient for the scale models on the order of one foot or less for the models formed according to application Ser. No. 714,272, are still inconvenient, at best.

An alternative method for measuring a completed scale model is to use a scaled seismic survey, applying acoustic energy to the model at a surface location, and detecting reflected energy at surface receiver locations of the model. In order to generate an accurate zero-offset trace from such techniques, however, significant data processing is required, particularly considering sixty or greater "fold" of data per midpoint, as is conventionally used for such surveys. In addition, the use of a seismic survey method to measure the model is not appropriate where the seismic survey method itself is to be ultimately measured using the model. Furthermore, the angles at which the acoustic energy may be reflected, especially considering the finite boundaries of the scale model, can cause interference in the detected vibrations, which can cloud the results such that accurate measurement of the scale model may not result.

It is therefore an object of the present invention to provide a method and system for measuring the actual structure of a scale model of the earth's crust.

It is a further object of the present invention to provide such a method and system which may be performed efficiently, and in a non-destructive or non-invasive manner.

It is a further object of the present invention to provide such a method and system for obtaining zero-offset traces of the scale model of the earth, for use in development and verification of new and existing seismic data analysis techniques.

Geologic modeling, as opposed to geophysical modeling described hereinabove, simulates time-dependent movement of layers in the earth crust by stressing portions of a scale model and monitoring the response of the model to the stress stimulus. Such modeling is useful in understanding the effects of stress and strain on sub-surface structures, for purposes of hydrocarbon exploration (as reservoir traps are often created by such forces) and for predicting and measuring natural seismic activity. Conventional scale geologic models are formed of non-elastic materials which are somewhat deformable by physical pressure; examples of such materials include clays and dry sand. The scale model of the earth is formed in layerwise fashion using these materials, for example in a "sandbox" or other container. Generally, initial conditions such as faults, inclusions and the like are built into the model.

The simulation of the response of the earth to stress and strain forces is a time sequence event, generally lasting on the order of one hour or less, in which a known force (both direction and magnitude) is applied to a side of the model or a particular layer or layers therein. Monitoring of the model before, during and after the application of the force provides information regarding the behavior of the modeled structure to the model force.

Conventional techniques include visual or photographic inspection of the model surface before and after application of the force, from which the geologist may be able to infer the sub-surface response to the force. Sub-surface information is conventionally obtained from the model by immobilizing the model and slicing vertically or horizontally therethrough to reveal cross-sections of its internal structure, for example cross-sections at vertical "dips". Sand models generally require some amount of solidification prior to sectioning. Examples of such techniques are described in Naylor, et al., "Fault geometries in basement-induced wrench faulting under different initial stress states", *J. Structural. Geology*, Vol. 8, No. 7 (Pergamon, 1986), pp. 737–752 (sectioning of a sand model after impregnation with gelatin), and in Hildebrand-Mittlefehldt, "Strain fields in and around boudins in a clay experiment", *J. Structural Geology*, Vol. 5, No. ¾ (Pergamon, 1983), pp. 465–470 (sampling of a clay model after replacement of water with a plastic). CAT scans have also been performed of the stressed scale model, if the size of the model is limited (e.g., for models having a thickness of on the order of up to one foot).

These conventional measurement techniques for geologic modeling present significant limitations to the analysis of the model results, however. While surface inspection provides real-time data in a relatively easy manner, such inspection provides little direct information concerning sub-surface response to the applied force. While sectioning or core sampling of the model provides the desired information about the internal model structure after stress, this information can only be acquired on a sampled basis, such that important sub-surface response may not be detected at locations missed by the samples and sections. Furthermore, the process of sectioning or sampling, and analysis of the sections or samples to infer the response of the entire model, is quite time-consuming.

Furthermore, significant information regarding the geologic modeling, particularly the dynamics of structures internal to the model, cannot feasibly be obtained using conventional sectioning and sampling techniques. This is because the sectioning of the model is not only destructive at the sectioned location, but requires relief of all stresses prior to sectioning (to avoid the sectioning itself from relieving the stress). Furthermore, as noted hereinabove, additional processing to solidify or otherwise stabilize the model structure is often necessary. Accordingly, sectioning of the model necessarily is performed at the end of the stress event, as continued stress after the sectioning would not provide an accurate model of the earth response.

In particular, geologic phenomena such as the type and amount of displacement and deformation are highly time-dependent, with the time-dependency often being quite complex. For example, a small fault may initially slip as the force is applied, remain inactive for some time, and become active again later, splaying into several faults. Such complex dynamics may not be visible at the surface and therefore not detectable by real-time visual inspection, and of course are not directly detectable by sectioning or sampling at the end of the test in the conventional manner. Other time-dependent dynamics useful in determining the cause of folding, compaction (i.e., dewatering) and other geologic effects also cannot be monitored merely by end-of-test sectioning or sampling.

Time dependent monitoring of the model by cross-sectioning could conceivably be performed in an iterative fashion, with sections made at varying amounts of time or force. However, such iterative modeling would require the rebuilding of the model for each iteration, as the test cannot be continued after sectioning due to destruction of the model and relief of existing stresses and strains. Such reconstruction of the model would not only be time-consuming and expensive, but the size, elasticity and other attributes of the modeled structure will necessarily vary from iteration to iteration, incorporating error into the iterative results.

It is therefore an object of the present invention to provide a method and system of geologic modeling where real-time information concerning sub-surface structures can be acquired during the application of force to the scale model.

It is a further object of the present invention to provide such a method and system where the information is acquired in a non-destructive manner.

It is a further object of the present invention to provide such a method and system useful both with clay and sand geologic models.

Other objects and advantages of the present invention will be apparent to those of ordinary skill in the art having reference to the following specification together with its drawings.

SUMMARY OF THE INVENTION

The invention may be incorporated into a method and system of modeling a geophysical or geologic model of an actual or fictitious region of the earth. In the geophysical case, a layered scale model of the earth is fabricated using elastic materials such as plastics and epoxies. In the geologic case, the layered scale model is fabricated using non-elastic deformable materials, preferably clays, to which a force of known amplitude and direction is applied to one or more layers of the model. In either case, according to the present invention, zero-offset sonographic imaging indicates the location and other attributes of sub-surface structures in the model. This information is used to verify the position of structural layers in the geophysical model, so that scaled seismic data acquisition and interpretation techniques may be tested and verified using the scale model. For the geologic model, a time series of images is obtained so that time-dependent displacement and deformation of internal structures and layers as a result of the force can be monitored.

DETAILED DESCRIPTION OF THE PREFERRED EMBODIMENTS

Figure 1:
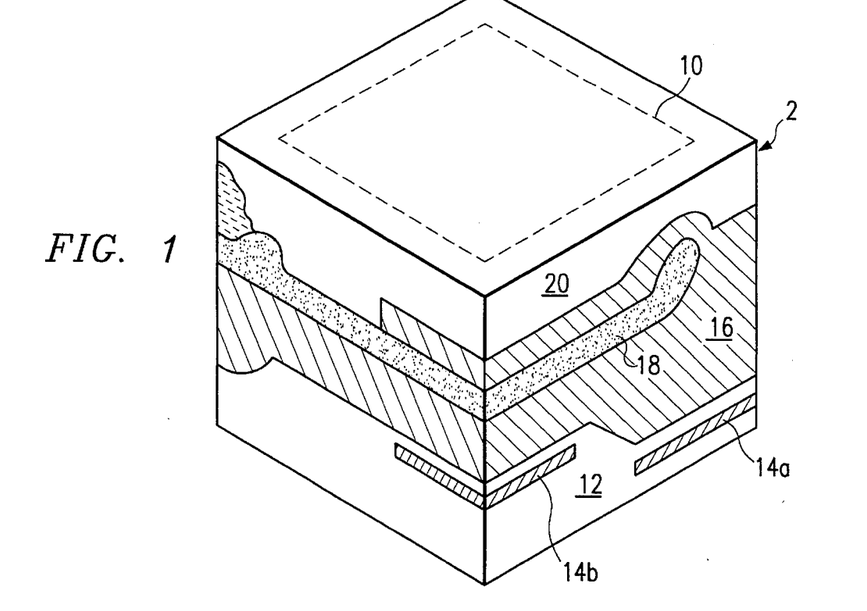
FIG. 1 is a perspective view of a geophysical model used in a first preferred embodiment of the invention.

Referring now to FIG. 1, a perspective view of scale geophysical model 2 according to a first preferred embodiment of the invention will be described in detail. Scale geophysical model 2 corresponds to either an actual volume of the earth, or alternatively to a fictitious geophysical volume useful specifically designed to evaluate survey and analysis techniques. Model 2 includes multiple layers 12, 14, 16, 18, 20 of varying materials of physical properties corresponding to layers found in the earth's crust, and of shapes corresponding to the actual or experimental sub-surface structures to be modeled.

For purposes of the present invention, scale model 2 may be fabricated according to conventional techniques in which the size and shape of each layer is defined by the formation of a wood form, preferably fabricated in a laminated fashion, of the desired size and shape. A plaster mold is then formed around the wood form in the conventional manner. A moldable material having the desired physical properties such as acoustic velocity (compressional, horizontal and vertical shear), density, and the like is then molded within the plaster mold to form the model layer. Each molded layer may be used to mold a surface of the next adjacent layer, or each layer may be separately molded by way of a plaster mold. Model 2 is then constructed by placement of the completed layers, generally with an adhesive or other bonding agent applied therebetween, to form a laminated block representing the volume of the earth to be modeled. Conventional dimensions for model 2 formed according to this method are on the order of one to three feet on a side.

Alternatively, the method described in said copending application Ser. No. 714,272, filed Jun. 12, 1991, incorporated herein by reference, and assigned to Atlantic Richfield Company may be used. According to this method, as described therein, some or all of the layers of the scale model are pre-fabricated by way of stereolithography or another precision layerwise fabrication technique, according to which the shape and size of the layer is stored in computer memory, with the layer fabricated in layerwise fashion according to the stored shape. The stored data is used in the construction of the layer, for example by controlling the direction and activation of a laser beam as it scans a curable liquid, to define a cross-section of the layer. The prefabricated layers may fit together to construct the scale model, or may be used to define the shape and size of molded layers therebetween. According to this technique, scale model 2 is sufficiently precise that the overall size of model 2 is contemplated to be on the order of 10 inches on a side, allowing for simulations to be performed on a desktop or a laboratory benchtop. The scaling for such a model will thus be on the order of one inch equal to two thousand feet. In addition, it is contemplated that conventional stereolithography and other modern prototype part fabrication techniques are sufficiently precise (with precision on the order of 0.005 inches) such that layers such as layer 12 may be formed as modular parts that fit together without requiring an adhesive therebetween.

Even though the fit is contemplated to be sufficiently precise so that adhesives are not generally necessary, certain high precision experiments may require the use of an adhesive, as desired. Such adhesives may be of conventional composition, or may consist of the same material as that of the layers to be adhered.

As noted hereinabove, layers 12, 14, 16, 18, 20 are formed to have different physical properties, such as acoustic velocity. For example, the range of velocities contemplated by the present invention is from 1000 ft/sec to 18,000 ft/sec or greater. Many materials are available which are suitable for the construction of the layers as will be described hereinbelow, and which have the physical properties of interest. Examples of these materials are various two-part epoxies, rubbers and plastics, photopolymers curable by ultraviolet light, as well as other plastics such as PVC and ABS; other materials, such as low melting point metals, may also be used.

In either case, model 2 provides a medium by which the response of a portion of the earth to seismic stimuli may be simulated. According to this embodiment of the invention, data acquisition techniques (e.g., survey design) and data analysis and interpretation algorithms can be applied to model 2 by deploying a vibration source and one or more vibration detectors at selected locations of the top surface of top layer 20, as described in said copending application Ser. No. 714,272. Sources or detectors may also be deployed at locations within model 2; for example an oil well may be modeled by the drilling or other formation of a small diameter hole from the surface of model 2, with a detector or source placed therewithin. The vibration sources and detectors may be one of any number of conventional transducers or other similar apparatus for generating vibrations responsive to an electrical signal, and for generating an electrical signal corresponding to detected vibrations, respectively, such as conventional transducers available from Panametrics, Inc. Many conventional transducers are capable of performing both functions (i.e., source and receiver), and are typically used in solid, contact-type simulation using conventional molded models.

In this application, it is preferable that the source and detectors so used are capable of generating and detecting, respectively, vibrations of relatively high frequencies, much higher than those used in actual field seismic surveys. This is because the structural features of model 2 are dimensionally scaled relative to the true geological features in the earth. Since the resolution of a seismic survey is determined by the frequency of the vibrations used, and since the resolution required for model 2 is much finer than that in the earth (by a factor of on the order of 10,000), the simulation frequency must similarly be much higher. Vibration frequencies in the ultrasonic range are contemplated to be useful in this embodiment of the invention.

Once the source and receivers are deployed, the simulation is accomplished by energizing the source and enabling the detectors at various locations of the top surface of or at selected locations within scale physical model 2, in a manner which simulates a conventional seismic survey. It is preferred that the simulation data be acquired near the center of the top surface, for example within area 10, so that the sides of model 2 will be effectively infinitely distant from the paths of the vibrations and will not affect the simulation results. To perform the simulated survey, the energizing of the vibration source and the data acquisition from the receivers are controlled by a conventional computer, such as a personal computer workstation having the appropriate data acquisition capability. The detected vibrations are processed in real time, displayed on a video screen, and stored in a computer database (preferably both as raw data and also as processed) for analysis and redisplay in similar manner as for a conventional survey. Such analysis includes conventional techniques such as common midpoint (CMP) stacking, migration, normal move-out (NMO), dip move-out (DMO), and the like. As a result, a simulated seismic survey may be performed using scale geophysical model 2.

It should be noted that scale geophysical model 2 may be used to simulate either land-based or marine surveying. For the example of land-based surveying, top layer 20 of model 2 will be a solid of the desired physical property. For a simulated marine survey, model 2 may be constructed to have walls extending along the sides thereof, so that water or another liquid will serve as top layer 20, into and within which the vibrations may be generated and detected, respectively, simulating a marine survey.

The scaled survey described hereinabove, where acoustic energy is imparted at a source location and detected at multiple detector locations spaced therefrom, simulates seismic data acquisition in the field. The results obtained from such a survey are then analyzed according to conventional or new data analysis routines. The results of such data acquisition and data analysis can then be analyzed to determine the accuracy of the scaled survey design, data analysis techniques, or both, and the survey design or analysis algorithms modified accordingly. This simulation and verification approach is therefore quite valuable in the development of seismic data acquisition methods, as it is significantly more cost effective to obtain additional acoustic data from the scale model than in the field.

However, the ability to accurately verify and evaluate a new survey design or data analysis technique depends on the precision to which the structure of scale model 2 is known. As noted hereinabove, where the model is formed according to conventional plaster molding techniques, significant error and deviation is often present in the model from that of the design. Even with a high-precision scale model formed according to the method described in the above-referenced copending application Ser. No. 714,272, an indication of the response of the model to acoustic energy will be useful in the evaluation of a scale model seismic survey.

Figure 2:
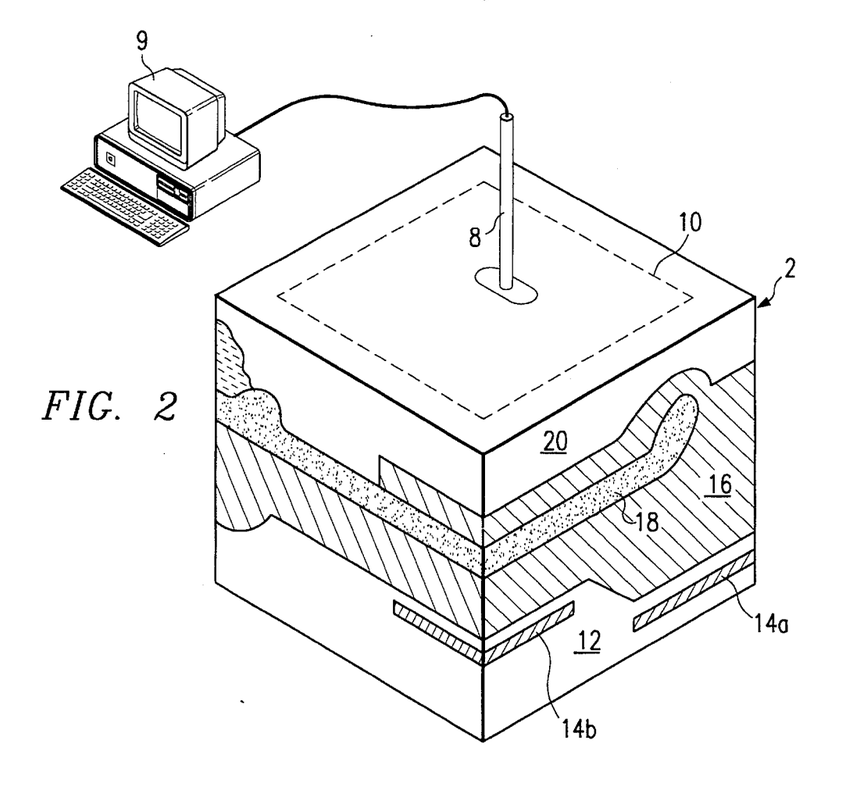
FIG. 2 is a perspective view of the model of FIG. 1 during the acquisition of data according to the first preferred embodiment of the invention.

According to the first preferred embodiment of the invention as shown in FIG. 2, zero-offset acoustic data is acquired by locating the receiver and source at the same surface location. The zero offset vibration amplitude-versus-time trace resulting from this measurement provides zero-offset measurement of the structure of scale geophysical model 2, such measurement not depending upon a stacking, move-out or other data processing methodology. The results of the zero-offset measurement can then be compared to the result of the simulated survey, for evaluation of the survey design, data analysis technique, or other experimental method under investigation.

According to this embodiment of the invention, this zero-offset measurement is acquired by the use of an adaptation of conventional sonography techniques to image the sub-surface structure of scale geophysical model 2. As is well known in the field of medical instrumentation, sonography is used for imaging internal organs, fetuses in utero, and the like. As illustrated in FIG. 2, ultrasonic wand 8 is placed on or near top surface 20 of model 2, and moved therealong in the conventional manner for medical sonography.

Figure 3A:
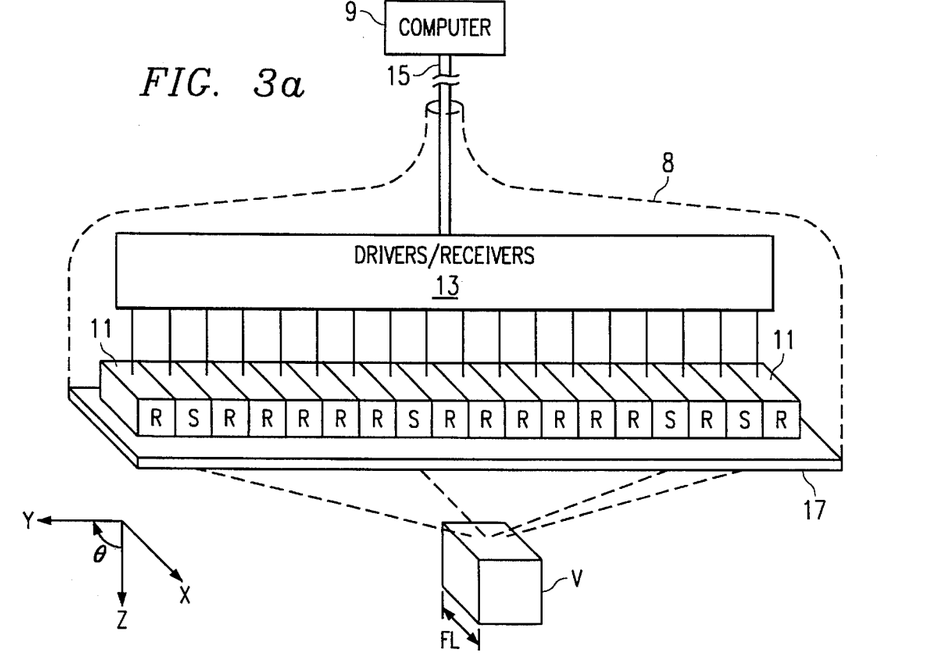
FIG. 3a is a perspective and schematic view of an ultrasonic wand used according to the preferred embodiments of the invention.

Referring to FIG. 3a, wand 8 includes multiple piezoelectric elements 11 to serve as acoustic sources and receivers; as is well known in the art, conventional piezoelectric elements are capable of serving as a source of acoustic energy when energized by a driver circuit, or as a receiver when coupled to a receiver circuit. Elements 11 are arranged in an array, which may be a single line as shown in FIG. 3a or an areal array as will be described hereinbelow. In the example of FIG. 3a, piezoelectric elements 11 are illustrated as within wand 8 (shown in shadow), each connected by way of a wire to conventional driver/receiver circuitry 13, which in turn is connected by way of cable 15 to computer 9. Computer 9 controls the sequence by which each of elements 11 serving as a source are energized, and also the receipt of signals from those of elements 11 that are serving as a receiver.

By way of example, the active surface of wand 8, at which are disposed elements 11 and acoustic lens 17 placed thereover (the operation of which will be described hereinbelow), has a size generally on the order of 0.5 inches by 4 inches, as in conventional wands for sonography.

Acoustic lens 17 is located between elements 11 and the target volume V to be imaged in model 2. The purpose of acoustic lens is to focus the output of those of elements 11 that are to serve as sources in the z-dimension illustrated in FIG. 3a. The focal length FL of volume V is a relatively small distance and is determined by acoustic frequency. For example, the focal length FL is on the order of a few inches for conventional sonographic wands 8 for ultrasonic energy at frequencies on the order of 2 to 5 MHz.

The azimuthal angle θ of volume V of interest in model 2 relative to wand 8, in the y-z plane as shown in FIG. 3a, is determined by the timing of the driving of those elements 11 that are serving as sources (for example, those of elements 11 indicated as S in FIG. 3a). Since the acoustic energy imparted by elements 11 follows substantially a spherical wave-front (assuming constant velocity material), the time delay between the driving of source elements 11 will determine the azimuthal angle θ and location of volume V at which the acoustic energy from each of the designated source elements 11 arrive coincident in time. Those elements 11 that are serving as receivers (for example, those of elements indicated as R in FIG. 3a) will receive the reflected energy (if any) from the acoustic input that is reflected from volume V, such as would occur if volume V contained an interface between material of different acoustic velocity. An azimuthal sweep may be performed, for a given position of wand 8, by varying the time delays among those of elements 11 serving as sources, focusing the acoustic energy on incremental volumes V varying in azimuthal angle θ. In addition, the selection of which of elements 11 are to serve as sources and which are to serve as receivers may vary with the azimuthal angle θ to optimize the survey for each volume V.

It is contemplated that near offset imaging would be accomplished by using each element 11 in turn as both a source and receiver. For example, the element 11 at a first end of wand 8 would be briefly energized by a driver in circuitry 13, such as to produce approximately an impulse vibration, and would then be enabled to receive the reflected impulse, if any. The remainder of elements 11 would be similarly energized and enabled each in sequence, thus providing a line of near offset data from a first stationary position of wand 8 over model 2, with all sideswipe and reverberations intact. Wand 8 could then be incrementally moved in the x-direction along the surface of model 2, and the process repeated to provide the next line of near-offset data from model 2; after a sweep of the surface of model 2, the process could again be repeated for a sweep in the next incremental y-position of the surface of model 2. Collation of the results from each survey results in a near-offset survey for model 2.

Figure 3B:
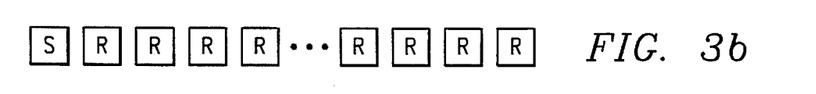
FIGS. 3b, 3c, 3d are plan views of various arrangements of source and receiver elements within the ultrasonic wand.

Referring to FIG. 3b, an alternative selection of elements 11 as source and receivers is shown in plan view. In the example of FIG. 3b, a linear array of elements 11 are used, for example having 128 elements 11, with an element 11 at the end of the array serving as the source (S) and the remainder of the elements 11 serving as receivers (R). This arrangement corresponds to a "streamer" as used in conventional seismic surveying of the earth.

Figure 3C:
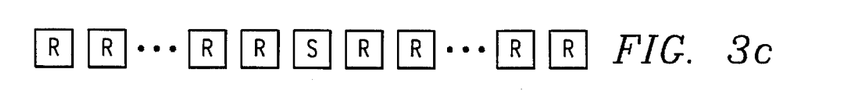

FIG. 3c illustrates, in plan view, another alternative selection of elements 11 in a linear array, where the center element 11 is designated as the source (S) and the elements 11 on either side are designated as receivers (R). This arrangement in FIG. 3c corresponds to a "split spread" survey as conventionally used in the seismic surveying of the earth.

Figure 3D:
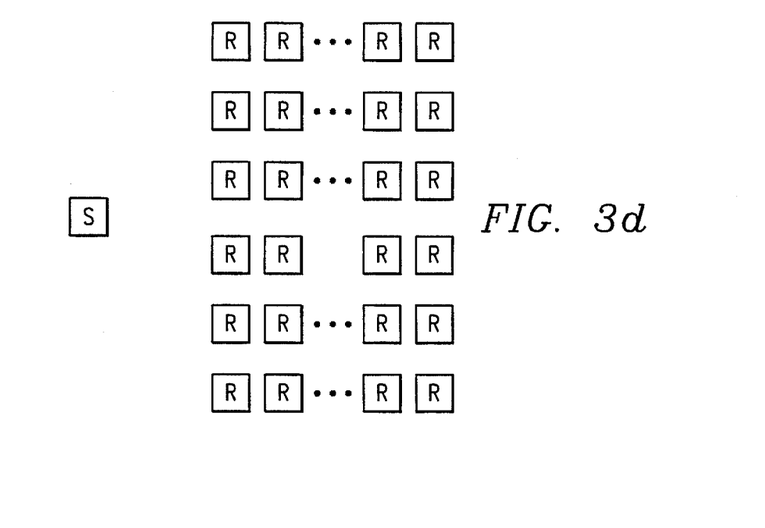

FIG. 3d illustrates, in plan view, an areal array of elements 11 serving as a "receiver patch", as is well-known in the surveying art. It is contemplated that sixty elements 11 may be so arranged, and contained within a single wand 8. Piezoelectric element 11' is located elsewhere at the surface of model 2 in this instance, for example in another wand, and is moved around the surface of model 2 to provide a 3-D survey of model 2 in the conventional manner known for seismic survey of the earth.

The ultrasonic energy imparted and received by wand 8 has a frequency on the order of from 1 to 7 MHz; accordingly, the resolution of the image provided by this embodiment of the invention is quite fine, for example on the order of 0.002 inches. It is preferred that wand 8 has an ultrasonic power output rated at on the order of from 2 to 20 watts; this power level allows for clear imaging of elastic layers within scale geophysical model 2 up to on the order of 6 inches in thickness; this power rating is larger than available for conventional medical sonography wands, and thus a specialized wand 8 may be required. The ultrasonic signal can be generated by wand 8 in pulsed wave, continuous wave, high PRF, and other conventional modes, as is conventional in the medical imaging field.

Wand 8 and driver/receiver circuitry 13 are connected to an associated computer 9 by way of cable 15, as shown in FIG. 3a. As noted above, computer 9 controls the generation of ultrasonic energy by elements 11 in wand 8 that are designated as sources, and which analyzes the reflected ultrasonic energy received by elements 11 in wand 8 that are designated as receivers in response to the acoustic energy imparted. An image can then be generated from this received energy in the conventional fashion. The image generation techniques utilized by computer 9 can include ultrasonic beamforming, Doppler imaging, and other conventional imaging algorithms. Examples of conventional sonography equipment suitable for use according to the present invention, and which are presently available, include .the "ACUSON" 128 computed sonography system, available from Acuson Corporation, and the "ATL" sonography system available from Advanced Technology Laboratories. Each of these systems include a wand which produces high resolution ultrasonic waves of various types, controlled by a computer which includes sufficient image processing capability to provide a real-time image of the structure under analysis.

While conventional medical sonography systems may be used in the present invention, it is of course contemplated that zero-offset sonography systems, customized for geophysical or geologic modeling by power output, frequency, imaging algorithms and the like can also be constructed and utilized. Such customized systems may be of particular benefit for certain difficult materials, particularly in the geologic modeling as will be discussed hereinbelow.

In operation, wand 8 is preferably moved in parallel swaths across top surface 20 of model 2, thus obtaining zero-offset traces for region 10 of interest. Gathering of the zero-offset traces in a line perpendicular to the direction of travel of wand 8, such gathering either performed by computer 9, or by the human analyst using individual images generated from each pass of wand 8 across top surface 20, can provide a cross-sectional view of a plane of scale geophysical model 2. As is well known in the medical sonography field, the generated images do not necessarily indicate the absolute wand-to-structure distance. Therefore, for purposes of the present invention in imaging scale geophysical model 2, a calibration structure (e.g., a small artifact of known dimension and of a material which is opaque to ultrasonic energy) may be embedded within one of the layers of scale model 2 at a known location; alternatively, the actual thickness of one of the upper layers of model 2 may be measured prior to its incorporation into the model, with this thickness used as a calibration point. The generated image may then be calibrated to precisely determine the position and size of structures internal to scale model 2.

The precise measurements for the various structures within scale geophysical model 2 obtained by this embodiment of the invention are extremely useful in the development of seismic survey designs and of seismic data processing techniques. Once the model structure is precisely determined from knowledge of the velocity of the layers with the recorded zero offset traces, or by way of the precisely-made depth model, the results of full common depth point (CDP) experimental data acquisition from the model can be accurately evaluated thereagainst, with modifications to the survey design or data analysis methods made as desired, and the modified methods again evaluated. The accurate measurement of scale model 2 obtained from this embodiment of the invention increases the confidence level that deviations between the simulated survey and the structure of model 2 are due to the survey or analysis technique under investigation, rather than due to inaccuracies between the model design and its actual construction. The survey design and data processing techniques under evaluation can then be accurately tested in the laboratory, improving confidence in the new techniques accuracy when implemented in the field environment.

In addition, this embodiment of the invention allows for such imaging to be performed in real-time, without requiring removal of model 2 to a CAT scan or other imaging apparatus, such removal impractical for models of two feet or larger on a side. Furthermore, the imaging technique according to this embodiment of the invention is particularly useful for models 2 fabricated according to the methods described in said copending application Ser. No. 714,272, as modified layers in model 2 may be rapidly produced if the position or size of a structure is indicated by sonography method as being incorrect or otherwise in error.

Figures 4A, 4B:
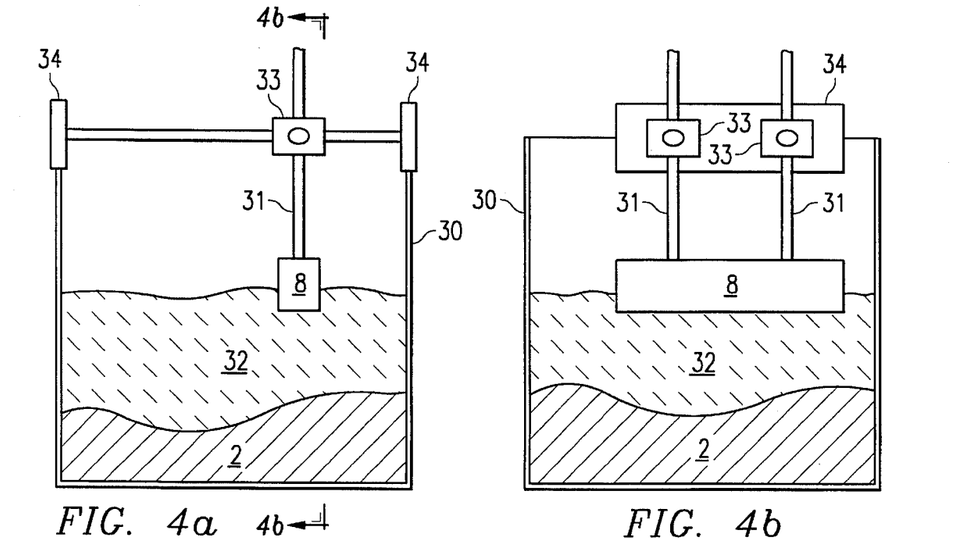
FIGS. 4a and 4b are cross-sectional elevations of an apparatus including a scale model constructed according to the preferred embodiment of the invention.

Referring now to FIGS. 4a and 4b, an example of an apparatus particularly suitable for performing geophysical modelling, including a test model constructed and measured according to this embodiment of the invention will be described.

Water 32 is disposed over model 2 in this example of the apparatus. Wand 8 is suspended from a pair of traveling brackets 33 by way of vertical shafts 31. Each of vertical shafts 31 is held within its associated traveling bracket 33 by way of a nut or other tightening mechanism, so that the vertical position of wand 8 below traveling brackets 33 may be adjusted for each modeling exercise. Traveling brackets 33 in turn travel along horizontal shafts 35 suspended between side brackets 34 on opposing sides of tank 30. Adjustment of the position of traveling brackets 33 along horizontal shafts 35 thus sets the position of wand 8 over model 2, in one planar direction, so that a record thereof may be made. Side brackets 34 are preferably movable along the upper edges of the sides of tank 30, so that the position of wand 8 may be incremented or adjusted in the other planar direction as well.

Motion of wand 8 over model 2 in the apparatus of FIGS. 4a and 4b may be accomplished by hand positioning or, if desired for controlled accuracy, by a pair of conventional stepper motors. Incremental positioning of wand 8 over model 2 will then allow for a survey of model 2 to be taken over the region of interest therewithin.

By way of example, an experiment model 2 is fabricated by way of stereolithography to produce layers of XB 5134-1 polymer available from Ciba-Geigy, having an undulating surface, and disposed within a tank 30. The acoustic velocity of this materials is approximately 7340 ft/sec. In this example, the layer of XB 5134-1 polymer varied from approximately 0.25 to 0.75 inches in thickness, and was placed over a plexiglass base. The size of tank 30 as experimentally used is on the order of 50 cm on a side. The depth of water 32 over model 2 was on the order of 10 cm. The ATL sonography system noted hereinabove was used for performing this modeling experiment, using ultrasonic energy at 3.5 MHz and less than one watt in power, via 64 source/receiver channels. The undulating surface of the modeled photopolymer in thickness was readily visible in the video display of the output from the ATL sonography system.

Other experiments have been performed in which layers of different photopolymer (XB 5134-1 and XB 5131 photopolymers, for example) have been used to form adjacent layers and structures in the model, and in which the conventional ATL sonography systems noted above has distinguished the materials from one another.

Figure 5A:
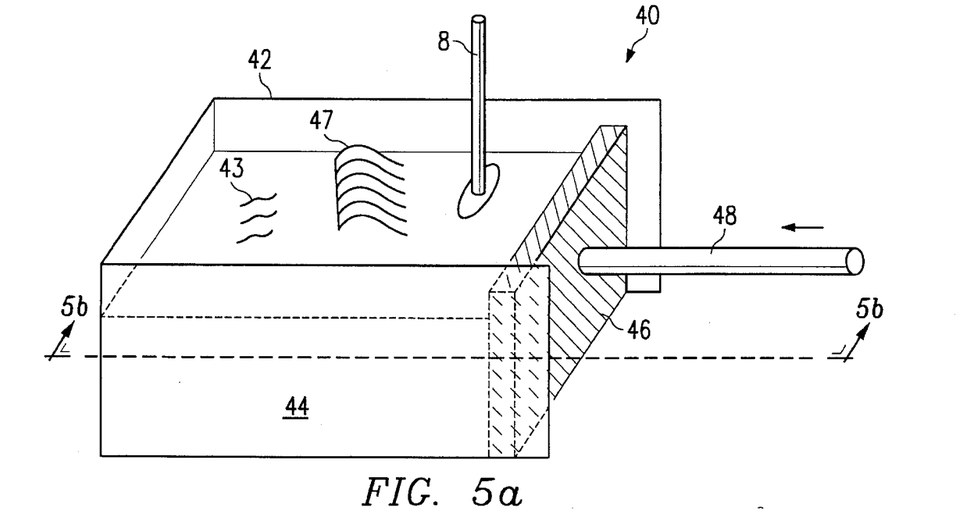
FIGS. 5a and 5b are perspective and cross-sectional views, respectively, of a geologic model used in a second preferred embodiment of the invention.
Figure 5B:
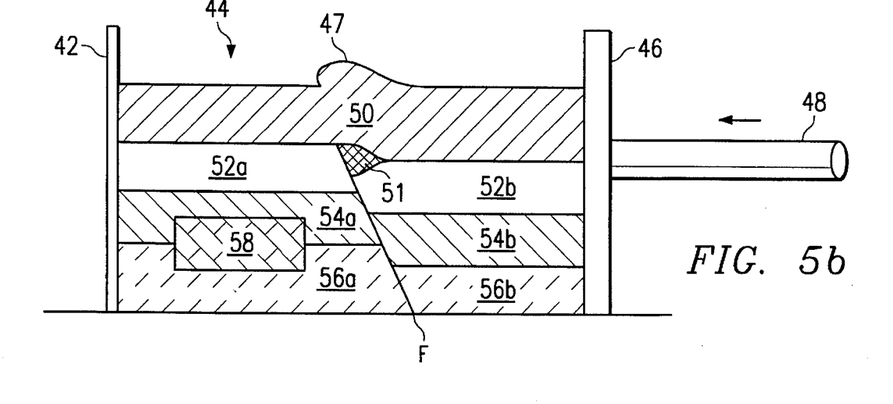

Referring now to FIGS. 5a and 5b, the simulation of geologic events by scale geologic model 40 according to a second preferred embodiment of the invention will now be described in detail. As noted hereinabove, the geologic events which are primarily of interest in the fields of hydrocarbon exploration and earthquake prediction and analysis are the displacement and deformation of layers of the earth's crust in response to geologic forces. Such displacement and deformation are not only dependent upon the direction and magnitude of the forces, but are also heavily time-dependent, often in a quite complex fashion (i.e., generally non-linear with time). Conventional real-time geologic scale simulation is limited to visual inspection of the surface of a scale geophysical model, with sub-surface measurements of the model generally limited to end-time sectioning and sampling, after relief of the sub-surface stresses of the model. These prior techniques, in combination, can at best provide only the basis for inferring sub-surface dynamic conditions, as neither provides real-time sub-surface measurement of the model. This second preferred embodiment of the invention is directed to providing such measurement.

Referring to FIG. 5a, an example of geologic model 40 is illustrated which is useful in connection with this embodiment of the invention. Model 40 includes walled enclosure 42, having a bottom and walls on three sides; one side and the top of enclosure remain open, so that force may be applied thereto and the response monitored, as will be described hereinbelow. Layered bed 44 is contained within enclosure 42, and simulates an actual or fictitious portion of the earth to be modeled. According to this embodiment of the invention, bed 44 is preferably formed of various clays, having the characteristics desired for simulating the earth. Clays are preferred for this embodiment of the invention as they are non-elastic, deformable, and permit the transmission of ultrasonic energy therethrough, with reflection and refraction of the energy occurring at interfaces between layers thereof. This ultrasonic technique is capable of detecting various cracks, such as faults and fractures, that occur when the clay layers are distorted during the modeling process.

Various rock types may be modeled by using conventional clays mixed with varying amounts of water. According to the present invention, the ultrasonic measurement is able to detect and display the complex interactions among varying rock types in the model. This is in contrast to conventional clay or sand modeling which uses a layer of a single material type, with pre-existing faults or fractures in place prior to distortion of the single layer of material.

In operation, compressive force is applied to one side of bed 44 by way of plunger 46 and piston 48, such that bed 44 is compressed against the wall of enclosure 42 opposite plunger 46. This force is preferably applied by a controllable motor or the like, so that the magnitude of the force is both known and reproducible for later runs of the same (or controllably varied) experiment. The force applied by plunger 46 causes stresses and strains within layered bed 44, such stresses and strains sufficient, over time, to cause internal displacement and deformation. Examples of surface manifestation of such displacement and deformation include surface escarpments 43 and bulges or striations 47, as shown in FIG. 5a. While plunger 46 is sized in this example as sufficient to apply a force on all layers of bed 44, it is contemplated that a narrower plunger may be used to apply a force to fewer than all of the layers in bed 44; further in the alternative, the;bottom surface (and layers) of bed 44 may be moved relative to the upper layers, as described in the above-cited Naylor et al. article, stressing the remaining layers therein.

Referring now to FIG. 5b, a cross-section of model 40 according to a second example will now be described, including an example of layered bed 44, with force applied thereto by plunger 46. As illustrated in FIG. 5b, clays of various composition and structural properties may be used to create a model of a region of the earth's crust. In this example, a surface clay layer 50 overlies three lower layers 52, 54, 56, with the properties of layers 50, 52, 54, 56 having different, or at least alternating, structural properties. Each of layers 52, 54, 56 are split, with a fault line F therebetween, such that portions 52a, 52b of layer 52 are offset from one another at fault line F. Fault line F may be formed to have the desired inclination and position during the placement of layers 52, 54, 56 into bed 44. Bounding region 58 is also provided in geologic model 40, in this example located between layers 54a, 56a beyond fault line F from plunger 46. It is contemplated that other sub-surface structures, arrangements, faults and regions can be similarly implemented in layered clay bed 44, as is well known in the art.

Responsive to the force applied by plunger 46, displacement and deformation of layers 50, 52, 54, 56, 58 may begin. In the example of FIG. 5b, the force of plunger 46 has caused bulge 47 to appear at the surface, with void 51 forming at fault line F between layers 52a, 52b, and 50. As is well known, voids such as void 51 may be a potential reservoir for hydrocarbons; the present invention therefore allows monitoring of the dynamics of creation of such reservoir traps, by way of real-time sub-surface monitoring of the resultant displacement and deformation.

According to this embodiment of the invention, as in the embodiment described hereinabove, sonographic imaging may be used in conjunction with scale geologic model 40 to provide real-time measurement of internal displacement and deformation. Accordingly, ultrasonic wand 8 is applied to the surface of top layer 50 of bed 44, and moved therealong in similar manner as in the geophysical modeling case described hereinabove. Wand 8 may directly contact layer 50; alternatively a layer of water or other ultrasonic coupling medium may be applied over clay layer 50, to which the active surface of ultrasonic wand 8 may be applied. Computer 9 (not shown) receives the detected ultrasonic energy as well as the source vibrations, and applies conventional algorithms thereto, so that images of the sub-surface structures are generated in the conventional manner as in medical sonographic imaging.

According to this embodiment of the invention, where sub-surface dynamics are of interest, images of the internal structure of bed 44 are obtained for multiple sample points in time. Since such sonography is non-invasive and non-destructive, such measurements may be made by wand 8 in real-time, during the application of the force by plunger 48, generating a time series of images of the sub-surface structures in bed 44. This time series may be used to observe and measure internal dynamics of the geologic simulation, and without requiring relief of stresses and strains, or other processing such as solidification, as necessary in the prior geologic modeling techniques described hereinabove. Correlation of the image time series with the time characteristic of the displacing force applied by plunger 46, provides significant insight into the dynamics of geologic events, including such dynamics as the formation of reservoir traps, and the timing and magnitude of major earthquakes.

Figure 6:
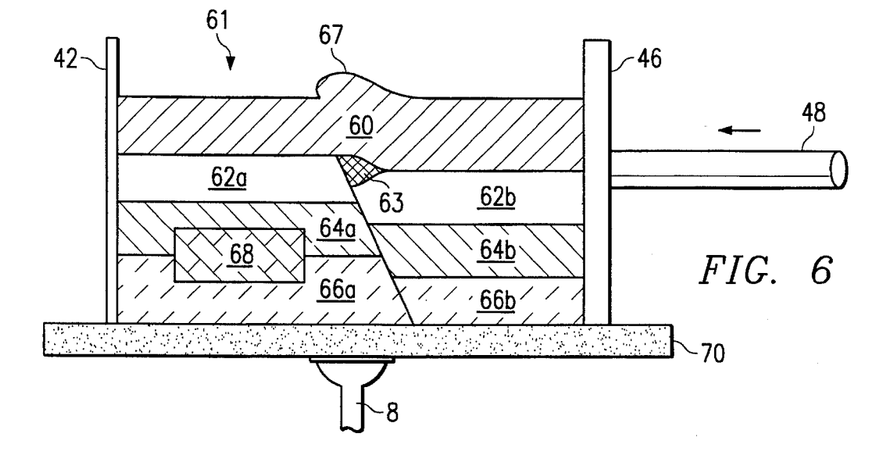
FIG. 6 is a cross-sectional view of a geologic model according to an alternative embodiment of the invention.

In the example of bed 44 shown in FIG. 5b, as described hereinabove, layers 50, 52, 54, 56 and bounding region 58 are preferably clay-based, as the transmission of ultrasonic energy therethrough is facilitated by such water-bearing materials, particularly relative to other conventional geologic modeling materials such as sands. However, the use of sand in the geologic model is preferred in some cases, as sand can represent rocks of a different scale model "strength" than that of the clay-based materials. Referring now to FIG. 6, an alternative embodiment of the invention utilizing sonography for sand-based geologic modeling will now be described.

FIG. 6 is a cross-section of sand-based scale geologic model 59 according to this alternative embodiment. Similarly as model 40 described hereinabove, model 59 includes three-walled enclosure 42 (one wall of which is shown in cross-section) for containing a model bed 61 to which force may be applied by plunger 46 and piston 58. Sand-based bed 61 includes layers 60, 62, 64, 66, and bounding region 68, formed of sands of various types and structural attributes, such varying attributes obtained by varying the moisture content of the sand from layer to layer. Fault line F is formed by staggering the interfaces between portions of layers 62, 64, 66, as described above for model 40. Also similarly as in clay-based model 40, surface striation 67 and void 63 are examples of the effects of the force applied to bed 61 by plunger 46.

For sand-based model 59 according to this embodiment of the invention, it is contemplated that contact of the surface of layer 60 at the top of bed 61 will not provide adequate imaging, due to the generally poor coupling of ultrasonic energy into, and its transmission through, dry sand. It is not feasible to add water to sand-based bed 61 in this model, due to the relative inability of sand to bear adequate amounts of water; the addition of water will thus disturb the structure of the model and cause erroneous simulation of the earth. According to this embodiment of the invention, the bottom of enclosure 42 is formed of metal plate 70 which is contacted by ultrasonic wand 8 as shown in FIG. 6. Metal plate 70 provides sufficient coupling of ultrasonic energy to sand-based bed 61 to enable imaging of the internal structures thereof over time. In addition, the known fixed relationship of metal plate 70 to bed 61 also facilitates calibration of the sonographic image, enabling absolute dimensional measurements.

While metal plate 70 provides good coupling of ultrasonic energy to sand-based bed 61, thus enabling imaging thereof, it is expected that the ultrasonic energy will be attenuated by metal plate 70 to some extent. In addition, due to the relatively dry state of sands in such a bed 61, the ability to sharply image structures internal to sand-based bed 61 will also be reduced relative to a clay-based bed as described hereinabove. It is therefore contemplated that higher power ultrasonic energy will need to be applied by ultrasonic wand 8 to metal plate 70 in this embodiment of the invention in order to achieve an image of similar quality as that obtained from the embodiment of FIGS. 5a and 5b. Power levels on the order of ten watts and above are expected to be sufficient for imaging according to this embodiment.

Similarly as in the case of the clay-based model 40, a time series of images are preferably taken of sand-based bed 61 by periodically traversing the bottom surface of interest of metal plate 70, for example in a series of parallel swaths of wand 8 therealong. The time series of images can then be used to measure and monitor time-dependent stresses and strains within geologic model 59, without requiring relief of the stress in order to obtain the measurements, such that internal dynamics of the model can be viewed and analyzed. As noted hereinabove, such information has heretofore been unavailable in the field of geologic modeling.

Figure 7:
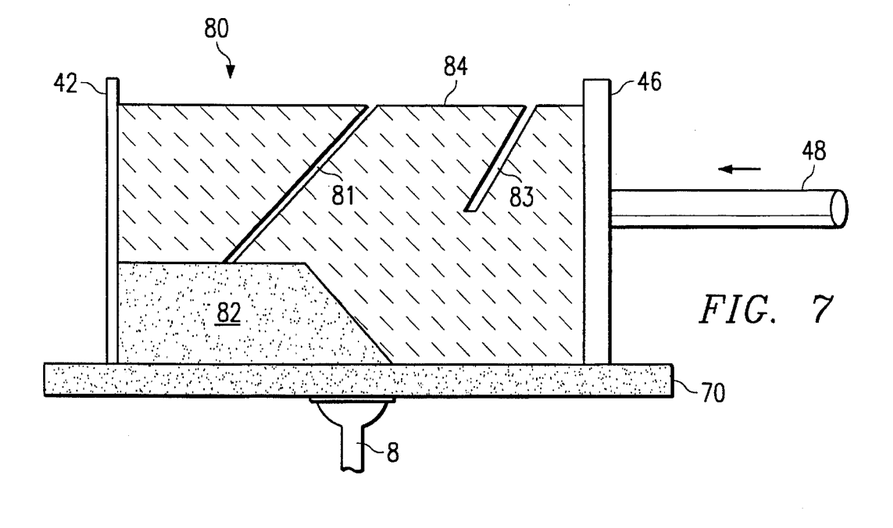
FIG. 7 is a cross-sectional view of a geologic model according to a further alternative embodiment of the invention.

The use of bottom metal plate 70 through which the ultrasonic energy from wand 8 couples may also be used in connection with a simple clay-based model 80, as shown in FIG. 7. In the model of FIG. 7, fixed steel plate 82 is located directly over bottom plate 70 adjacent far wall 42 of model 80 from plunger 46. Single clay layer 84 is placed over bottom plate 70 and steel plate 82, with cuts 81, 83 extending fully and partially therethrough, respectively, to model fractures, faults and the like. Fixed steel plate 82 models a non-displacable and non-deformable layer against which clay layer 84 will deform as a result of the motion of plunger 46. As in the case of model 61 in FIG. 6, wand 8 transmits and receives ultrasonic energy to and from model 80 via bottom plate 70, to provide real-time information concerning the response of model 80 to the force applied by plunger 46, thus modeling the sub-surface dynamics of the geologic structure without requiring stress relief, solidification, and other invasive processing required in prior modeling techniques.

While the invention has been described herein relative to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

I claim:

1. A method of modeling a portion of the earth, comprising:

constructing a scale model of a portion of the earth, said scale model comprising a plurality of structures adjacent one another having different acoustic velocities from one another;

coupling ultrasonic energy into said scale model from a source at a surface of the scale model;

detecting said ultrasonic energy with a plurality of receivers, each located at said surface, the ultrasonic energy detected by each receiver having traveled from said source through a portion of said scale model to said receiver;

moving said source and said plurality of receivers along said surface of the scale model; and generating an image of a portion of said scale model from the ultrasonic energy detected by said plurality of receivers.

2. The method of claim 1, wherein said source and said plurality of receivers are disposed at a surface of a wand;

and wherein said moving step comprises moving said wand across said surface.

3. The method of claim 1, wherein said constructing step comprises:

molding at least one of said plurality of structures using a moldable material.

4. The method of claim 1, wherein said constructing step comprises:

prefabricating at least one of said plurality of structures by storing, in a computer data base, information corresponding to said structure; and fabricating said one of said plurality of structures from said stored information.

5. The method of claim 1, wherein said constructing step comprises:

forming said plurality of structures of deformable material;

and further comprising:

applying a force to another surface of said model.

6. The method of claim 5, wherein said coupling, detecting and moving steps are performed a plurality of times during said applying step, so that said generating step generates a time series of said images.

7. The method of claim 6, wherein said deformable material comprises clay.

8. The method of claim 6, wherein said deformable material comprises sand.

9. The method of claim 8, wherein a bottom surface of said model is in contact with a metal plate;

and wherein said bottom surface is the surface at which said coupling and detecting steps are performed, said source and said plurality of detectors being coupled to said bottom surface via said metal plate.

10. The method of claim 1, wherein said source and said plurality of receivers each comprise a piezoelectric element.

11. The method of claim 10, wherein the piezoelectric element comprising said source is also used as a receiver in said detecting step.

12. The method of claim 1, wherein said coupling step comprises:

coupling ultrasonic energy into said scale model from a plurality of sources at a surface of the scale model.

13. The method of claim 12, wherein the ultrasonic energy coupled, in said coupling step, from each of said plurality of sources is generated in a first delayed fashion relative to one another;

and further comprising:

repeating said coupling and detecting steps, prior to said moving step, wherein the ultrasonic energy coupled, in said coupling step, from each of said plurality of sources is generated in a second delayed fashion relative to one another.

* * * * *